United States Patent
Zhang

(10) Patent No.: US 8,772,395 B2
(45) Date of Patent: Jul. 8, 2014

(54) HIGH DAMPING RUBBER PREPARATION RAW MATERIAL FOR CAR VIBRATION REDUCTION PRODUCT

(76) Inventor: Lei Zhang, Zhucheng (CN)

( * ) Notice: Subject to any disclaimer, the term of this patent is extended or adjusted under 35 U.S.C. 154(b) by 0 days.

(21) Appl. No.: 13/637,356

(22) PCT Filed: Feb. 10, 2011

(86) PCT No.: PCT/CN2011/070918
§ 371 (c)(1),
(2), (4) Date: Sep. 25, 2012

(87) PCT Pub. No.: WO2012/088783
PCT Pub. Date: Jul. 5, 2012

(65) Prior Publication Data
US 2013/0267642 A1    Oct. 10, 2013

(30) Foreign Application Priority Data
Dec. 28, 2010   (CN) .......................... 2010 1 0608523

(51) Int. Cl.
| | | |
|---|---|---|
| *C08L 9/00* | (2006.01) | |
| *C08L 23/06* | (2006.01) | |
| *C08K 3/22* | (2006.01) | |
| *C08K 3/18* | (2006.01) | |
| *C08L 21/00* | (2006.01) | |
| *C08F 8/00* | (2006.01) | |
| *C08L 15/02* | (2006.01) | |
| *C08L 23/28* | (2006.01) | |
| *C08K 5/00* | (2006.01) | |
| *C08K 3/04* | (2006.01) | |

(52) U.S. Cl.
CPC ................. *C08L 15/02* (2013.01); *C08K 5/005* (2013.01); *C08K 3/04* (2013.01); *C08L 23/283* (2013.01); *C08K 3/22* (2013.01)
USPC ............. 524/432; 524/13; 524/492; 524/493; 525/216; 525/320

(58) Field of Classification Search
CPC ....... C08L 23/283; C08L 15/02; C08L 91/00; C08K 3/04; C08K 3/22; C08K 5/005
USPC ............. 524/13, 492, 493, 432; 525/216, 320
See application file for complete search history.

(56) References Cited

U.S. PATENT DOCUMENTS

| | | | | |
|---|---|---|---|---|
| 7,696,266 B2 * | 4/2010 | Waddell et al. | ................. | 524/13 |
| 2003/0114571 A1 * | 6/2003 | Pan | ............................... | 524/492 |

* cited by examiner

Primary Examiner — Liam J Heincer
Assistant Examiner — Marilou Lacap
(74) Attorney, Agent, or Firm — Che-Yang Chen; Law Office of Michael Chen

(57) ABSTRACT

The present invention makes public a type of car vibration damping products using high damping rubber compound materials, involving the rubber technical field, whose features are the following ones: chloride butyl, 100; carbon black N220, 10-40; carbon black N330, 20-50; naphthenic oil H-3107, 20-40; age resister RD, 1-3; age resister 4010NA, 1-3; homogenizing agent 40MSF, 3-6; indirect zinc oxide, 5-10; magnesium oxide, 0.1-0.5; accelerating agent BZ, 1-5. By the above deployed car vibration damping products which use high dumping rubber, you get excellent heat and age resisting properties, and also high dumping properties.

4 Claims, No Drawings

HIGH DAMPING RUBBER PREPARATION RAW MATERIAL FOR CAR VIBRATION REDUCTION PRODUCT

BACKGROUND OF THE INVENTION

1. Field of the Invention

The present invention belongs to the technical field of rubber, particularly involved is high damping rubber preparation raw material for car vibration reduction product.

2. Description of the Related Art

Following the rapid expansion of high performance technology of car manufacturing industry, automobile technology is developing towards the aspects of vehicle economy, riding comfort and safety. At present from the point of view of vibration damping, noise immunity, riding comfort and traveling safety, higher requests have been advanced to the cars using rubber damping elements. Rubber shock absorbing implements have a very good function of vibration damping, insulating and buffering. To improve vibration damping's heat resistance, vibration damping products use many rubber types, principally natural rubber, but also chloroprene rubber (CR), butyl rubber (IIR), ethylene propylene diene monomer (EPDM), etc.

To guarantee the products' survivability, in the cooperating project of vibration damping rubber we must consider the holdout of extended physical properties during the time. Rubber's heat resistance temperature will boost from today's 70° C. to 100° C., gap service temperature will reach 120° C.

At present cars use rubber suspensions mostly for rubber and metal structure, because their mature technology and cheap cost have a wide application space in the appropriate time span. But average rubber suspensions use natural rubber, so the damping is small, the absorbing vibration ability is small, the vibration isolation ability of suspension system is poor, and the effect of vibration isolation of motor idling is particularly poor.

SUMMARY OF THE INVENTION

To satisfy the product requests concerning high damping and heat resisting conditions of rubber materials, the present invention provides car vibration damping products that use high damping rubber preparing materials.

To gather the requirements above, a type of car vibration damping products using high damping rubber preparing materials must have the following, materials in parts by mass: chloride butyl, 100; carbon black N220, 10-40; carbon black xN330, 20-50; naphthenic oil H-3107, 20-40; age resister RD, 1-3; age resister 4010NA, 1-3; homogenizing agent 40MSF, 3-6; indirect zinc oxide, 5-10; magnesium oxide, 0.1-0.5; accelerating agent BZ, 1-5.

The present invention adopts chlorinated butyl rubber as the principal material of high damping rubber. As the methyl in its molecular chain is extremely concentrated, chlorinated butyl rubber (CIIR) takes a wormlike structure; also because near glass transition temperature there is a secondary transformation, whose result is that its damping function is different from average elastomers' one, the peak of internal friction is both high and wide, there are evident damping effects. After chlorination, butyl rubber has a high reactivity, a fast speed of vulcanization, a good binding function with metals and other features; at the same time, there is a backbone saturation of chlorinated butyl rubber, a low activity, and it has an excellent resistance to natural weathering and excellent heat-resisting properties. Thus, chlorinated butyl rubber is the ideal material for making high damping rubber components. But it has not to be directly used, because it needs an appropriate reinforce system and vulcanization system: that is one aspect of the present invention to be researched.

The present invention adopts a metallic oxide vulcanization system, which overcomes the defects of heat and age resisting of vulcanized rubber material used in ordinary vulcanization systems, so that rubber achieves a balanced speed of vulcanization and the best heat-resisting quality.

The present invention adopts STRUKTOL homogenizing agent 40MSF, which is a type of homogenizing agent used for chlorinated butyl sizing. 40MSF is dark colored and is a mixture of fragrant hydrocarbon resins, which have a good intermiscibility with the majority of rubber materials (for example, CR, IIR, EPDM, etc.) and are also used in blending high shell bodies and sizing single assembled bodies; by using these resins, filling dispersion degree, cementation degree and other physical properties improve remarkably.

Chlorinated butyl rubber is a not self reinforced rubber, it needs a reinforcing system to reach better tensile strength. Reinforcing system is similar to commonly used rubber, generally it employs carbon black N220, N330 and N550, but it considers the models N220 and N330 of high damping carbon black among preparation materials, and softener is selected for chain hydrocarbon or naphthenic hydrocarbon.

The present invention passed through many experiments and researches about using carbon black N220 and N330, and softener selected naphthenic oil.

Main raw material sources:

Chloride butyl, brand CIIR1066, American Exxon Mobil Chemical Industry;

Homogenizing agent 40MSF, STRUKTOL;

Magnesium oxide, Shanghai Dunhuang Chemical Company;

Naphthenic oil H-3107, Beijing Ideal Chemical Company.

The automobiles adopting the present invention use high damping and heat-resisting rubber damping preparation materials, obtain the best material performance, tensile strength is greater than 14.0 Mpa, elongation at rupture is more than 400%, 20 HZ damping coefficient at normal temperature is more than 0.30, long run temperature reaches 100° C. The technology of sizing material injection operates steadily, thus it can well satisfy the product requests about rubber high damping and heat-resisting requirements.

DETAILED DESCRIPTION OF THE PREFERRED EMBODIMENTS

Example 1

| No. | Component | Mass/part |
| --- | --- | --- |
| 1 | Chloride butyl | 100 |
| 2 | Carbon black N220 | 10 |
| 3 | Carbon black N330 | 50 |
| 4 | Naphthenic oil H-3107 | 40 |
| 5 | Age resister RD | 1 |
| 6 | Age resister 4010NA | 1 |
| 7 | Homogenizing agent 40MSF | 3 |
| 8 | Indirect zinc oxide | 5 |
| 9 | Magnesium oxide | 0.5 |
| 10 | Accelerating agent BZ | 1 |

Air aging 120° C. × 70 h properties: rigidity transformation +5

Tensile strength rate of change −14.5%

Elongation at rupture rate of change −28.7%

Dynamic test: frequency 20 HZ, preload 1 mm, amplitude ±0.5 mm, damping coefficient 0.32.

Example 2

| No. | Component | Mass/part |
|---|---|---|
| 1 | Chloride butyl | 100 |
| 2 | Carbon black N220 | 40 |
| 3 | Carbon black N330 | 20 |
| 4 | Naphthenic oil H-3107 | 20 |
| 5 | Age resister RD | 3 |
| 6 | Age resister 4010NA | 1 |
| 7 | Homogenizing agent 40MSF | 3 |
| 8 | Indirect zinc oxide | 10 |
| 9 | Magnesium oxide | 0.15 |
| 10 | Accelerating agent BZ | 2 |

Air aging 120° C. × 70 h properties: rigidity transformation +6

Tensile strength rate of change −16.5%

Elongation at rupture rate of change −20.2%

Dynamic test: frequency 20 HZ, preload 1 mm, amplitude ±0.5 mm, damping coefficient 0.35.

Example 3

| No. | Component | Mass/part |
|---|---|---|
| 1 | Chloride butyl | 100 |
| 2 | Carbon black N220 | 30 |
| 3 | Carbon black N330 | 30 |
| 4 | Naphthenic oil H-3107 | 30 |
| 5 | Age resister RD | 1.5 |
| 6 | Age resister 4010NA | 1.5 |
| 7 | Homogenizing agent 40MSF | 4.5 |
| 8 | Indirect zinc oxide | 4 |
| 9 | Magnesium oxide | 0.25 |
| 10 | Accelerating agent BZ | 2.5 |

Air aging 120° C. × 70 h properties: rigidity transformation +8

Tensile strength rate of change −18.3%

Elongation at rupture rate of change −26.3%

Dynamic test: frequency 20 HZ, preload 1 mm, amplitude ±0.5 mm, damping coefficient 0.34.

Example 4

| No. | Component | Mass/part |
|---|---|---|
| 1 | Chloride butyl | 100 |
| 2 | Carbon black N220 | 25 |
| 3 | Carbon black N330 | 35 |
| 4 | Naphthenic oil H-3107 | 35 |
| 5 | Age resister RD | 2.5 |
| 6 | Age resister 4010NA | 3 |
| 7 | Homogenizing agent 40MSF | 4 |
| 8 | Indirect zinc oxide | 10 |
| 9 | Magnesium oxide | 0.5 |
| 10 | Accelerating agent BZ | 2.5 |

Air aging 120° C. × 70 h properties: rigidity transformation +7

Tensile strength rate of change −20.3%

Elongation at rupture rate of change −24.8%

Dynamic test: frequency 20 HZ, preload 1 mm, amplitude ±0.5 mm, damping coefficient 0.33.

Example 5

| No. | Component | Mass/part |
|---|---|---|
| 1 | Chloride butyl | 100 |
| 2 | Carbon black N220 | 20 |
| 3 | Carbon black N330 | 50 |
| 4 | Naphthenic oil H-3107 | 40 |
| 5 | Age resister RD | 1 |
| 6 | Age resister 4010NA | 2 |
| 7 | Homogenizing agent 40MSF | 5 |
| 8 | Indirect zinc oxide | 8 |
| 9 | Magnesium oxide | 0.3 |
| 10 | Accelerating agent BZ | 3 |

Air aging 120° C. × 70 h properties: rigidity transformation +8

Tensile strength rate of change −22.5%

Elongation at rupture rate of change −26.8

Dynamic test: frequency 20 HZ, preload 1 mm, amplitude ±0.5 mm, damping coefficient 0.36.

After employing the compound materials above, high damping properties of rubber material can satisfy product sizing performance requirements.

The compound materials of the present invention project have been elaborated through the processes above mentioned, and the present invention implement can satisfy the following technologic main points: (1) sizing materials have excellent heat and age resisting properties; (2) compound sizing materials have high damping properties.

What is claimed is:

1. A high damping rubber preparation raw material for car vibration reduction product, comprising of the following materials in parts by mass: chlorinated butyl rubber, 100; carbon black N220, 10-40; carbon black N330, 20-50; naphthenic oil, 20-40; age resister comprising poly(1,2-dihydro-2,2,4-trimethylquinoline), 1-3; age resister comprising N-isopropyl-N'-phenyl-1,4-phenylenediamine, 1-3; homogenizing agent, 3-6; indirect zinc oxide, 5-10; magnesium oxide, 0.1-0.5; accelerating agent, 1-5.

2. The high damping rubber preparation raw material for car vibration reduction product according to claim 1, comprising of the following materials in parts by mass: chlorinated butyl rubber, 100; carbon black N220, 10; carbon black N330, 50; naphthenic oil, 40; age resister comprising poly(1,2-dihydro-2,2,4-trimethylquinoline), 1; age resister comprising N-isopropyl-N'-phenyl-1,4-phenylenediamine, 1; homogenizing agent, 3; indirect zinc oxide, 5; magnesium oxide, 0.5; accelerating agent, 1.

3. The high damping rubber preparation raw material for car vibration reduction product according to claim 1, comprising of the following materials in parts by mass: chlorinated butyl rubber, 100; carbon black N220, 40; carbon black N330, 20; naphthenic oil, 20; age resister comprising poly(1,2-dihydro-2,2,4-trimethylquinoline), 3; age resister comprising N-isopropyl-N'-phenyl-1,4-phenylenediamine, 1; homogenizing agent, 3; indirect zinc oxide, 10; magnesium oxide, 0.15; accelerating agent, 2.

4. The high damping rubber preparation raw material for car vibration reduction product according to claim 1, comprising of the following materials in parts by mass: chlorinated butyl rubber, 100; carbon black N220, 30; carbon black N330, 30; naphthenic oil, 30; age resister comprising poly(1,2-dihydro-2,2,4-trimethylquinoline), 1.5; age resister comprising N-isopropyl-N'-phenyl-1,4-phenylenediamine, 1.5;

homogenizing agent, 4.5; indirect zinc oxide, 4; magnesium oxide, 0.25; accelerating agent, 2.5.

\* \* \* \* \*